(12) United States Patent
Corda et al.

(10) Patent No.: US 8,495,175 B2
(45) Date of Patent: Jul. 23, 2013

(54) METHOD AND SERVICE PROVIDER FOR MANAGING EXPIRED OR CONSUMED APPLICATIONS BEING STORED IN MOBILE COMMUNICATION DEVICES

(75) Inventors: Alexandre Corda, Nice (FR); Jonathan Azoulai, Sophia Antipolis (FR); Vincent Lemonnier, Nice (FR)

(73) Assignee: NXP B.V., Eindhoven (NL)

( * ) Notice: Subject to any disclaimer, the term of this patent is extended or adjusted under 35 U.S.C. 154(b) by 551 days.

(21) Appl. No.: 12/682,738

(22) PCT Filed: Oct. 8, 2008

(86) PCT No.: PCT/IB2008/054128
§ 371 (c)(1),
(2), (4) Date: Apr. 12, 2010

(87) PCT Pub. No.: WO2009/050617
PCT Pub. Date: Apr. 23, 2009

(65) Prior Publication Data
US 2010/0223361 A1   Sep. 2, 2010

(30) Foreign Application Priority Data
Oct. 15, 2007   (EP) .................................... 07291255

(51) Int. Cl.
*G06F 15/16* (2006.01)
(52) U.S. Cl.
USPC ................ 709/219; 709/203; 709/217; 713/2

(58) Field of Classification Search
USPC ................ 709/203, 217, 219; 713/2
See application file for complete search history.

(56) References Cited

U.S. PATENT DOCUMENTS

| | | | |
|---|---|---|---|
| 6,766,448 B2 * | 7/2004 | Kubota ............................ 713/2 |
| 8,005,508 B2 * | 8/2011 | Miyazaki et al. ............. 455/558 |
| 2004/0160911 A1 * | 8/2004 | Zilliacus et al. .............. 370/328 |
| 2004/0235450 A1 | 11/2004 | Rosenberg |
| 2006/0136548 A1 * | 6/2006 | Nishio et al. .................. 709/203 |
| 2006/0205385 A1 * | 9/2006 | Davydov et al. ............. 455/411 |
| 2007/0100753 A1 * | 5/2007 | Sato et al. ....................... 705/50 |
| 2007/0115149 A1 * | 5/2007 | Tann et al. ...................... 341/50 |
| 2007/0156436 A1 * | 7/2007 | Fisher et al. ..................... 705/1 |
| 2008/0022043 A1 * | 1/2008 | Adams et al. ................. 711/115 |
| 2008/0026730 A1 * | 1/2008 | Appaji ....................... 455/414.1 |
| 2008/0046710 A1 * | 2/2008 | Maddocks et al. ............... 713/2 |
| 2009/0313689 A1 * | 12/2009 | Nystrom et al. .................. 726/9 |

FOREIGN PATENT DOCUMENTS

WO    2007/068991 A    6/2007

* cited by examiner

*Primary Examiner* — Ramy M Osman

(57) ABSTRACT

A method for managing expired or consumed applications (app1, app2 . . . appx) that have been provided by a Service Provider (SP) and are stored in a memory element (SE) of a mobile communication device (MOB), e.g. a NFC mobile phone, comprises storing a representation (RP) of expired or consumed applications (app1, app2 . . . appx) in or on a storage medium that is separate from the memory element (SE).

15 Claims, 2 Drawing Sheets

METHOD AND SERVICE PROVIDER FOR MANAGING EXPIRED OR CONSUMED APPLICATIONS BEING STORED IN MOBILE COMMUNICATION DEVICES

FIELD OF THE INVENTION

The invention relates to a method for managing expired or consumed applications being stored in mobile communication devices.

The invention further relates to a computer program product directly loadable into the memory of a mobile communication device, comprising software code portions for performing the steps of a method according to the first paragraph when said product is run on the device.

The invention further relates to a mobile communication device being adapted to process the computer program product mentioned in the above paragraph.

The invention further relates to a Service Provider.

BACKGROUND OF THE INVENTION

There are mobile communication devices known which contain memory devices having unique memory device identifications, e.g. the MIFARE® classic family, developed by NXP Semiconductors, a contactless smart card IC operating in the 13.56 MHz frequency range with read/write capability. Recently, secure memory elements have been developed which are memory devices providing enhanced security features, particularly for the use in mobile phones and other mobile communication devices with Near Field Communication (NFC) capabilities. Said secure memory elements are also known as "Smart Cards". One of the leading representatives of these secure memory elements is the SmartMX (Memory eXtension) smart card family that has been designed by NXP Semiconductors for high-security smart card applications requiring highly reliable solutions, with or without multiple interface options. Key applications are e-government, banking/finance, mobile communications and advanced public transportation. SmartMX architecture combines coprocessors for RSA, ECC, DES and AES and enables implementation of operating systems including Java Open Platform and MULTOS. The ability of SmartMX cards to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security.

Service Providers like banks, public transport companies, loyalty programs owners etc. provide contactless services to customers who are defined as persons using the mobile communication devices, e.g. NFC mobile phones, for mobile communications and contactless services. These contactless services comprise the provision of transport passes, cinema tickets, coupons, etc. which can be subsumed by the generic terms "applications" and "services". In the following description the term "application" will be used which has to be understood in a broad sense.

A customer buys applications for instance by ordering them from the website of a Service Provider. In the course of the purchasing procedure the customer inputs a unique identification number of his/her communication device, e.g. the telephone number of a NFC mobile phone, so that the Service Provider knows unambiguously where to send the application.

Then the Service Provider transmits the application to the customer's mobile communication device via any communication channel, e.g. the Over The Air (OTA) transport services of a Mobile Network Operator to which the customer is subscribed. Alternatively, the Service Provider communicates indirectly with the mobile communication device via a Trusted Service Manager which securely distributes and manages the Service Provider's applications and transmits them to the mobile communication device. The Trusted Service Manager does not participate in the transaction stage of the applications, thus ensuring that the Service Provider's business models are not disrupted. Trusted Service Managers can be managed by one or a plurality of Mobile Network Operators, or by independent Trusted Third Parties.

When the applications are received by the mobile communication device they are stored in a secure memory element of the mobile communication device and can be consumed by the customer by positioning the mobile communication device within the range of transmission of a reading device which reads and processes the application in an appropriate manner, e.g. by giving the user access to an entrance of a concert hall. After the applications have been consumed or expired they have to be deleted from the memory element in order to free memory space for future applications.

However, deleting the expired applications from the memory element is problematic if the customer wants to keep a trace (could be a receipt) of the applications that he/she has consumed. The same problem arises if the customer wants to acquire a collector object from the applications consumed (for instance if the applications corresponds to a concert ticket).

OBJECT AND SUMMARY OF THE INVENTION

It is an object of the invention to provide a mechanism that enables the customer to keep applications that have been consumed or expired or representations of them and yet to delete the applications from the memory element of his/her mobile communication device.

In order to achieve the object defined above, with a method according to the invention characteristic features are provided so that a method according to the invention can be characterized in the way defined below, that is:

A method for managing expired or consumed applications that have been provided by a Service Provider and are stored in a memory element of a mobile communication device, e.g. a NFC mobile phone, wherein the method comprises storing a representation of expired or consumed applications in or on a storage medium that is separate from the memory element.

In order to achieve the object defined above, with a computer program product according to the invention characteristic features are provided so that a computer program product according to the invention is directly loadable into the memory of a mobile communication device and comprising software code portions for performing the steps of a method according to the invention when said product is run on the mobile communication device.

In order to achieve the object defined above, a mobile communication device according to the invention comprises an arithmetic-logic unit and a memory and processes the computer program product according to the above paragraph.

In order to achieve the object defined above, with a Service Provider according to the invention characteristic features are provided so that a Service Provider according to the invention can be characterized in the way defined below, that is:

A Service Provider, being adapted to provide applications, such as NFC application, and to initiate installing of said applications in mobile communication devices, wherein the Service Provider is further adapted to receive an application retrieval request and to process this retrieval request by retrieving the application from a data base, formatting a representation of the application according to the retrieval request and transmitting the formatted representation of the application to a customer via a communication channel, such as e-mail, or download from a remote server, or mail transport.

The characteristic features according to the invention provide the advantage that even when an expired or consumed application is deleted from the memory element of a mobile communication device the customer can keep a representation of the applications that he/she has consumed.

The measures as claimed in claim 2 provide the advantage that the customer has immediately access to the requested representation of the expired application.

The measures as claimed in claim 3 provide the advantage that free memory space is provided for installing future applications in the memory element.

The measures as claimed in any of claim 4 to claim 6 list different preferred formats of representations of expired applications.

The measures as claimed in claim 7 or claim 8, respectively, provide the advantage that making representations available to the customer is handled by the Service Provider which has originally generated the application for the customer. This embodiment of the application enables the customer to choose among different formats of representations of the expired applications and different channels through which he can receive the representations.

The aspects defined above and further aspects of the invention are apparent from exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
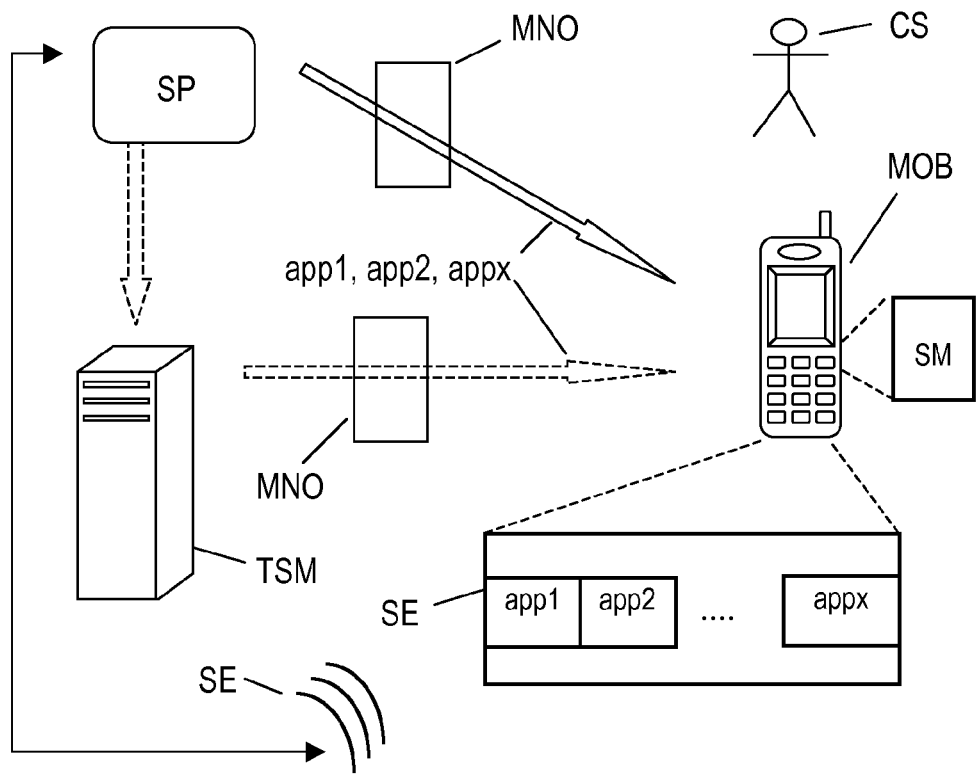
FIG. 1 shows a schematic diagram of a system for providing contactless services from Service Providers to mobile communication devices.

FIG. 1 shows a schematic diagram of a system for providing contactless services to mobile communication devices MOB. The system comprises a Service Provider SP (it should be noted that the number of Service Providers is not limited), a Mobile Network Operator MNO providing the full range mobile services, particularly UICC and NFC terminals plus Over The Air (OTA) transport services, and a mobile communication device MOB representing an unlimited number of mobile communication devices. The mobile communication device MOB belongs to a customer CS who is a subscriber of the Mobile Network Operator MNO. Let us assume that over the time the customer has ordered a number of NFC (Near Field Communication) applications app1, app2 ... appx, e.g tickets, transport passes and so on. The Service Provider SP has transmitted the applications app1, app2 ... appx either directly to the customer's mobile communication device MOB via the Over The Air transport services of the Mobile Network Operator MNO, or indirectly by sending them to a Trusted Service Manager TSM which then has forwarded the applications app1, app2 ... appx to the mobile communication device MOB via the Over The Air transport services of the Mobile Network Operator MNO. The Service Provider SP communicates with the Trusted Service Manager TSM via a computer network, such as the Internet, wherein the preferred data transmission protocol is HTTPS.

Additionally or alternatively, the Service Provider SP communicates with the mobile communication device MOB via a computer network and wireless services, e.g. NFC reading devices RD.

The mobile communication device MOB may e.g. be configured as a NFC mobile phone. The mobile communication device MOB comprises a secure memory element SE which is a memory device with enhanced security features, such as for instance a MIFARE device or a smart card like a SmartMX device. The mobile communication device MOB further comprises a service manager SM that is implemented as a computer program and is configured to manage the received applications app1, app2 ... appx, particularly to install them in the secure memory element SE and to delete them, if necessary. The customer CS consumes or uses the stored applications app1, app2 ... appx by positioning the mobile communication device MOB within the range of the reading device RD which reads and processes the applications in an appropriate manner, e.g. when one application is a transport pass by giving the customer CS access to a public transport system and at the same time reducing the number of remaining public transport tickets by one. In the end, making use of the applications app1, app2 ... appx results in consumed or expired applications that should be deleted from the secure memory element SE in order to free memory space for other applications.

Figure 2:
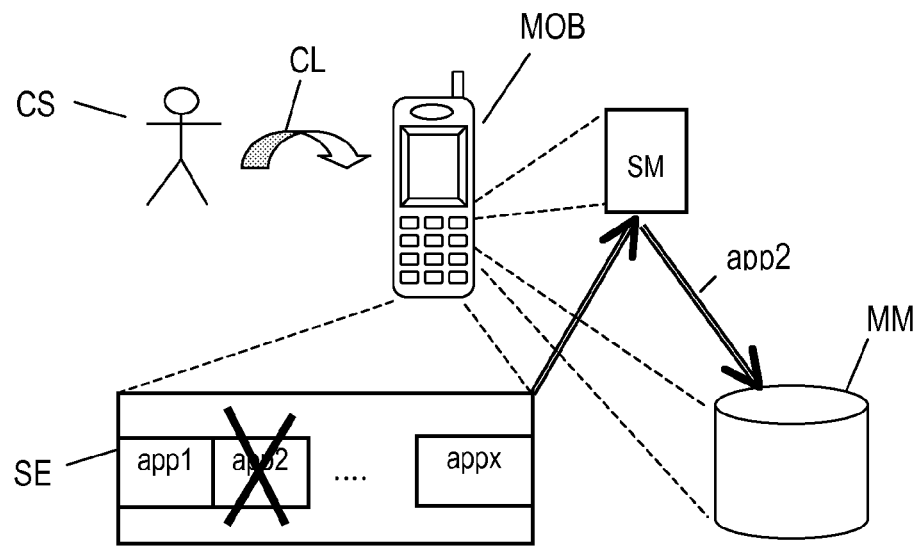
FIG. 2 and FIG. 3 show schematic flow charts of a first embodiment of a method for managing expired or consumed applications according to the present invention.
Figure 3:
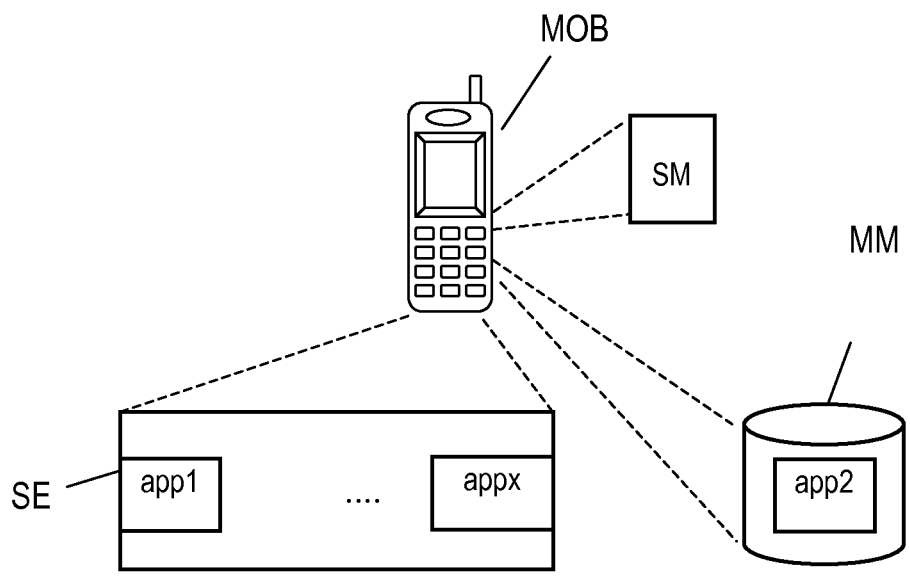
Figure 4:
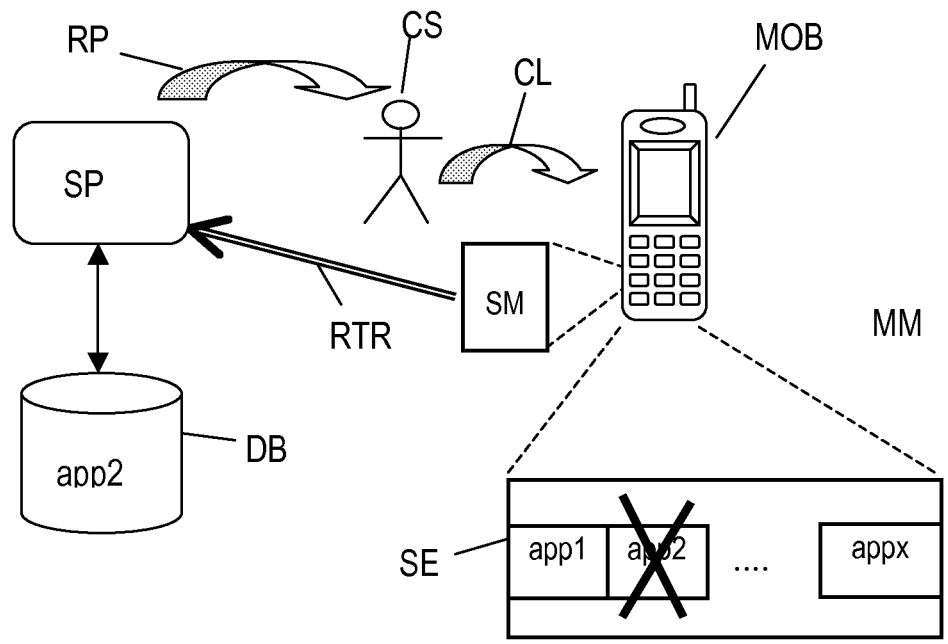
FIG. 4 shows a schematic flow charts of a second embodiment of a method for managing expired or consumed applications according to the present invention.

For the following explanations, let us assume that the application app2 has expired and shall be deleted from the secure memory element SE as shown in the schematic block diagram of FIG. 2. At the time when the application app2 has to be deleted the consumer CS chooses to keep the application app2. Alternatively he could also choose to keep a representation thereof. The consumer CS inputs a collecting request CL into his mobile communication device MOB, e.g. by pressing a combination of keys. The service manager SM in the mobile communication device MOB receives the collecting request CL and handles it by reading the application app2 from the secure memory element SE and storing a copy thereof in a collector memory MM separate from the secure memory element SE. The collector memory MM is either a dedicated memory element such as a memory card inserted into the mobile communication device MOB or an internal memory of the mobile communication device. When copying of the application app2 to the collector memory MM has successfully been completed the service manager SM deletes the expired or consumed application app2 from the secure memory element SE. In other words, the service manager SM handles the customer's CM collecting request CL by moving the application app2 from the secure memory element SE to the collector memory MM. The final state of this operation is shown in FIG. 3. It should be noted that deleting the application app2 from the secure memory element SE can be carried out by the service manager either automatically or upon a specific deleting request of the customer CS.

With reference to FIG. 3 a second embodiment of the invention will be explained now. Again, it is assumed that the application app2 has expired and shall be deleted from the secure memory element SE. The consumer CS chooses to keep a representation of the application app2. He inputs a collecting request CL into his mobile communication device MOB, e.g. by pressing a combination of keys. The service manager SM in the mobile communication device MOB receives the collecting request CL and handles it by connecting to the Service Provider SP, for instance via a wireless Internet connection, and sending a retrieval request RTR to the Service Provider SP asking the Service Provider SP to retrieve the application app2 from its application data base DB and to make it available for the customer CS in a format that has been chosen by the customer CS when inputting the collecting request CL. The chosen format can for instance be selected from the application app2 itself provided in a binary format, an electronic document containing specific information of the application app2 like the price, the name, a release number, a receipt, a characteristic image and so on, or a human-readable format, e.g by printing it on a printable substrate like a sheet of paper. After the Service Provider SP has formatted the representation RP of the application app2 as requested it transmits it to the customer CS via any suitable communication channel, e.g. via e-mail, or download from a remote server, or mail transport, etc.

After the service manager SE has sent the retrieval request RTR to the Service Provider SP it will delete the expired or consumed application app2 from the secure memory element SE. Deleting the application app2 from the secure memory element SE can be carried out by the service manager SM either automatically or upon a specific deleting request of the customer CS.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for managing expired or consumed Near Field Communication (NFC) applications that have been provided by a Service Provider and are stored in a secure memory element of an NFC equipped mobile communication device, wherein the method comprises storing a representation of an expired or consumed NFC application in or on a storage medium that is separate from the secure memory element, wherein the representation of the expired or consumed NFC application is stored in the separate storage medium in response to a collecting request from a user of the NFC equipped mobile communication device.

2. The method as claimed in claim 1, wherein the representation of the expired or consumed NFC application is stored in a memory element of the NFC equipped mobile communication device.

3. The method as claimed in claim 1, wherein the expired or consumed NFC application is deleted from the memory element of the NFC equipped mobile communication device.

4. The method as claimed in claim 1, wherein the representation of the expired or consumed NFC application is stored in an electronic document that is made available to a customer of the NFC equipped mobile communication device.

5. The method as claimed in claim 4, wherein the NFC equipped mobile communication device sends a retrieval request to the Service Provider asking the Service Provider to format a representation of the expired or consumed NFC application in a format that has been chosen by the customer.

6. The method as claimed in claim 5, wherein the Service Provider when receiving the retrieval request formats the representation according to the retrieval request and transmits the formatted representation of the expired or consumed NFC application to the customer via a communication channel, including at least one of an e-mail, a download from a remote server, and a mail transport.

7. The method as claimed in claim 1, wherein the representation of the expired or consumed NFC application is stored in a human-readable format by printing it on a printable substrate and making the printed substrate available to a customer of the NFC equipped mobile communication device.

8. The method as claimed in claim 1, wherein the representation of the expired or consumed NFC application is selected from the NFC application itself, or a graphic or written element.

9. A computer program product being directly loadable into the NFC equipped mobile communication device with an arithmetic-logic unit and a memory, wherein the computer program product comprises software code portions for performing the method according to claim 1 when running on the NFC mobile communication device.

10. A computer program product as claimed in claim 9, wherein the computer program product is stored on a computer readable medium or downloadable from a server via a data network.

11. An NFC equipped mobile communication device with an arithmetic-logic unit and a memory, being adapted to process the computer program product as claimed in claim 9.

12. A Near Field Communication (NFC) equipped mobile communication device having an arithmetic-logic unit, the NFC equipped mobile communication device comprising:
a secure memory element configured to store an NFC application;
a collector memory that is separate from the secure memory element; and
a service manager configured to manage NFC applications in the NFC equipped mobile communication device;
wherein the service manager is configured to store a representation of an expired or consumed NFC application in or on the collector memory and to delete the expired or consumed NFC application from the secure memory element;
wherein the representation of the expired or consumed NFC application is stored in the collector memory in response to a collecting request from a user of the NFC equipped mobile communication device.

13. The NFC equipped mobile communication device of claim 12, wherein the secure memory element comprises a memory device with enhanced security features.

14. The NFC equipped mobile communication device of claim 12, wherein the secure memory element comprises a MIFARE device.

15. The NFC equipped mobile communication device of claim 12, wherein the secure memory element comprises a smart card.

\* \* \* \* \*